Dec. 18, 1923.
C. M. HAMBLIN
FASTENING DEVICE
Filed June 7, 1921
1,478,218
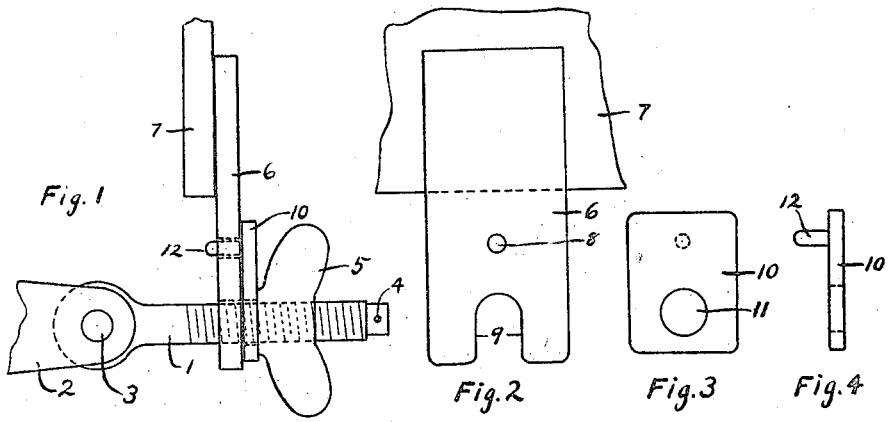
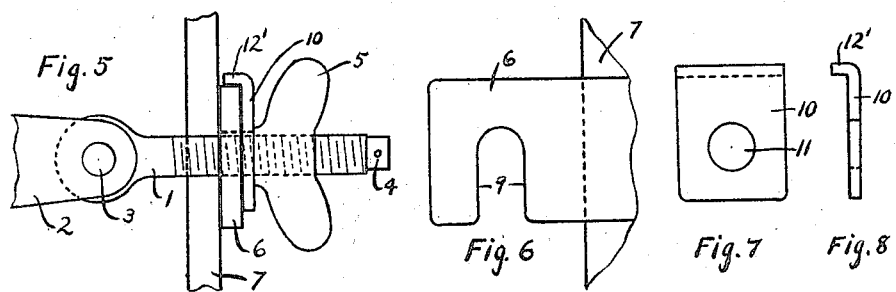
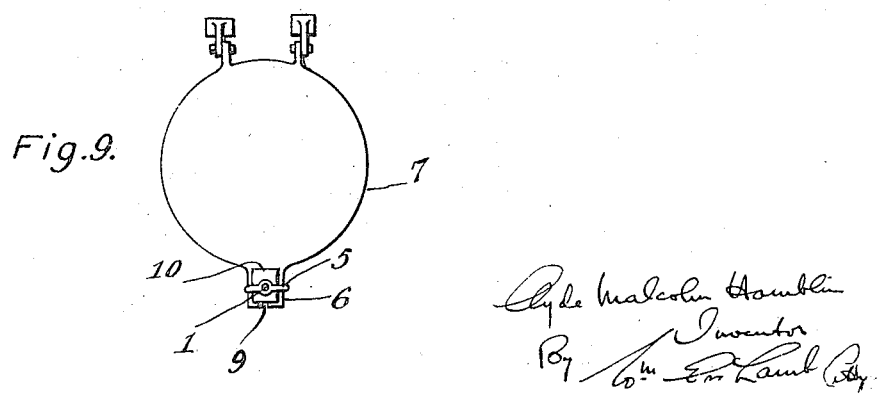

Patented Dec. 18, 1923.

1,478,218

UNITED STATES PATENT OFFICE.

CLYDE MALCOLM HAMBLIN, OF WASHINGTON, DISTRICT OF COLUMBIA.

FASTENING DEVICE.

Application filed June 7, 1921. Serial No. 475,847.

*To all whom it may concern:*

Be it known that I, CLYDE MALCOLM HAMBLIN, a citizen of the United States, residing at Washington, in the District of Columbia, have invented certain new and useful Improvements in Fastening Devices, of which the following is a specification.

This invention relates to fastener devices for ports, manholes and other similar closures and more particularly to a safety device for use in connection with such fasteners, by means of which they can be made more secure and reliable.

The object of the present invention is to provide in connection with a fastener of the well known pivoted latch type means whereby the accidental and unintended release of the fastener by reason of vibration or careless fastening may be entirely eliminated.

The invention consists in the novel construction, arrangement and combination of parts as hereinafter more particularly described and claimed.

One sheet of drawings accompanies this specification as part thereof, in which like reference characters indicate like parts throughout.

Figure 1 is a side elevation of a fastener provided with the present invention.

Figure 2 is a front view of the slotted part of the fastener.

Figure 3 is a plan view of the safety catch.

Figure 4 is a side view of the safety catch.

Figure 5 is a side view of a fastener provided with a modified form of the invention.

Figure 6 is a side view of the slotted member of Fig. 5.

Figure 7 is a front view of the modified catch shown in Fig. 5.

Figure 8 is a side view of the catch of Fig. 7.

Figure 9 indicates diagrammatically the application of the device to a port.

The present invention is an improvement on the well known and commonly used fastener which comprises generally a pivoted bolt which is adapted to swing into a slotted keeper and be secured therein by means of a nut. The objection to this type of fasteners is that on ships, trains, or similar structures subject to vibration in connection with which they are most generally used it is frequently desirable or necessary to secure closures which by reason of their location require that the slotted keeper member open downwardly, in which position if the nut works loose, as it is very likely to do by reason of the vibration, the bolt will drop and the closure will be left unfastened.

The present invention consists in providing a novel supplemental keeper which will not interfere with the rapid fastening of the device but which will prevent the dropping of the bolt.

Referring to the drawings, the fastener comprises a threaded bolt 1 pivoted as at 3 to frame 2. To closure 7 is secured a member 6 slotted as at 9 to receive bolt 1. Where member 6 is slotted from its end as in Fig. 2, a small hole 8 is provided above the slot but this would not be necessary where the slot extends upward from one side as in Fig. 6. A supplementary keeper part 10 is provided having a hole 11 slightly larger than the diameter of the bolt 1 and having a projecting stud 12 adapted to enter small hole 8 and so distanced from hole 11 that when in position bolt 1 extending through hole 11 will be held in proper locking position in slot 9. In the modified form illustrated in Figs. 7 and 8 the keeper 10 has one edge turned over to engage the top edge of member 6. As illustrated the bolt 1 is threaded and provided with a winged nut 5 which in operation is drawn tight against supplementary keeper 10 pressing same tightly against slotted member 6. When it is desired to release the device it is only necessary to screw back nut 5 sufficiently to permit the withdrawal of stud 12 from hole 8 or the passage of shoulder 12' over the edge of member 6. A substantial loosening of nut 5 from vibration or other accidental causes is permissible without any possibility of the locking bolt 1 dropping from locking engagement with slotted member 6.

Various modifications in the form and design of the supplementary keeper will suggest themselves and obviously its use is not restricted to threaded bolt fasteners.

Having thus fully described my invention, I claim:—

1. In a fastener having a pivoted member, a slotted member, and means for drawing the pivoted member through the slot of the slotted member; a keeper operated by the said drawing means adapted to engage the pivoted member and means for securing said keeper to the slotted member to retain the pivoted member in position in the slotted member.

2. In a fastener having a pivoted member and a slotted member having an indentation adjacent the slot, a keeper slidably secured on the pivoted member and having a projection adapted to engage the indentation of the slotted member.

3. In a fastener having a latch adapted to be secured in the slot of a slotted member, means for holding the latch in proper position in the slot of said slotted member, comprising a keeper encircling the latch and provided with an offset to engage the slotted member.

CLYDE MALCOLM HAMBLIN.